3,712,884
PREPARATION OF MONOMETHYL ETHERS
OF DIGOXIN
Wolfgang Voigtlander, Viernheim, Hessen, and Fritz
Kaiser, Lampertheim, Hessen, Germany, assignors to
Boehringer Mannheim G.m.b.H., Mannheim, Germany
No Drawing. Filed Nov. 19, 1970, Ser. No. 91,171
Claims priority, application Germany, Dec. 5, 1969,
P 19 61 034.5
Int. Cl. C07c 173/00
U.S. Cl. 260—210.5
6 Claims

ABSTRACT OF THE DISCLOSURE

Digoxin is reacted with dimethyl sulfate in dimethyl formamide in the presence of barium hydroxide to produce the monomethyl ether. By having aluminum oxide and an inert solvent present, the 4''' ether is produced and by having aluminum isopropylate present the 3'''-ether is produced.

The reaction product is worked up in chloroform and water is used to remove unreacted digoxin which is recycled for further etherification.

---

The present invention is concerned with an improved process for the preparation of pure digoxin monomethyl ethers.

It is known that derivatives of digoxin, i.e.

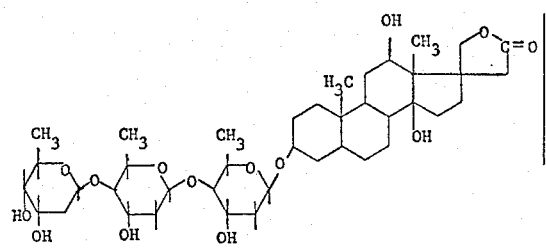

in which one or two hydroxyl groups of the three digitoxosyl radicals thereof are etherified by alkyl radicals containing 1 or 2 carbon atoms, are better absorbed enterally than digoxin itself and, therefore are outstandingly suitable therapeutic agents for oral administration in the treatment of human cardiac insufficiencies (see our U.S. Pat. No. 3,538,078).

From animal experiments and extensive clinical observations, we have, in the meantime, ascertained that two monomethyl ethers of digoxin are of especially great value for the treatment of weaknesses of cardiac muscle, namely 3'''-O-methyl-digoxin and, in particular, 4'''-O-methyl-digoxin.

Both compounds can be prepared by the process described and claimed in our above-mentioned U.S. Pat. No. 3,538,078 by reacting digoxin with conventional O-methylation agents, for example with dimethyl sulfate or diazomethane, using conventional process conditions. However, when the invention was first made which is disclosed in our above-mentioned British patent specification the exact constitution of the digoxin monomethyl ethers was not known. Furthermore, it was not possible to restrict the methylation reaction to the monomethyl stage without the use of the poisonous and explosive diazomethane, the use of which could scarcely be considered on a large scale.

In the case of conventional methylation processes, for example, with dimethyl sulfate, digoxin polyethers are formed in considerable amounts (20–30%) but these cannot be demethylated to give digoxin or monomethyl-digoxin. This means a considerable los of expensive starting material, which loss is increased still more because the desired monomethyl ether must be separated from the polymethyl ethers by chromatography. In the working up of the reaction mixture according to the process of our U.S. Pat. No. 3,538,078 it can also happen that digitoxose is split off to give the therapeutically useless digoxigenin.

It is accordingly an object of the invention to provide a process for the preparation of monomethyl ethers of digoxin in selective manner and high yield without need for extensive recovery procedures.

We have now found that, with the avoidance of the above-described disadvantages, the above-mentioned digoxin monomethyl ethers can be obtained in pure form by means of the known reaction of digoxin with dimethyl sulfate in dimethyl formamide in the presence of barium hydroxide when, surprisingly, there is added to the reaction mixture either (a) aluminum oxide or (b) aluminum isopropylate and an inert organic solvent, the reaction mixture, after being pre-purified and diluted with chloroform is mixed with pyridine, evaporated in a vacuum and separated in known manner from unreacted digoxin.

The important advantages of the new process according to the present invention are that the use of diazomethane is completely avoided, polymethyl-digoxins are formed to such a minor amount that a chromatographic purification can be omitted and, by selection of the process conditions, the methylation can be directed, as desired exclusively into the 3'''- or 4'''-hydroxyl group of the digitoxose side chain.

The process according to the present invention also reduces the cost of preparation of these valuable cardiac glycosides because the return of the separated digoxin to the methylation process ensures an almost complete conversion of the valuable digoxin starting material into the desired monomethyl ethers.

The elucidation of the structure of the monomethyl-ethers of digoxin obtained by the process according to the present invention by partial hydrolysis with 0.05 N hydrochloric acid to give digoxigenin monodigitoxoside, digoxigenin-bis-digitoxosde and digoxigenin, as well as complete acidic splitting with 0.1 N sulfuric acid and detection of the cymarose and 4-O-methyl-digitoxose split off, showed that the use, according to the process of the present invention, of aluminum oxide and an inert organic solvent results in the formation of the 4'''-O-methyldigoxin, whereas the reaction with the use of aluminum isopropylate leads to the formation of 3'''-O-methyldigoxin.

As inert solvent, there can be used any solvent which is miscible with dimethyl formamide and which is not attacked by the dimethyl sulfate under the reaction conditions; the amount of solvent to be added must be determined from case to case. An amount corresponding to the amount of dimethyl formamide used has proved to be favorable and toluene has proved to be especially useful for this purpose. Furthermore, there can also be used benezne, dioxane, chlorinated hydrocarbons such as ethylene chloride and chloroform, or cyclohexane.

The working up and purification of the mixture obtained of digoxin monomethyl ether and unreacted digoxin can be carried out, after evaporation of the crude product in a vacuum with the addition of pyridine, by means of multiplicative partition, for example, with chloroform-carbon tetrachloride-methanol-water (1:1:1:1 by volume), the O-methyl ether of digoxin in question being obtained in pure form by evaporation of the organic phase and recrystallization of the residue, for example from acetone. The digoxin present in the aqueous phase is extracted with chloroform and returned to another methylation reaction.

The following examples are given for the purpose of illustrating the present invention.

EXAMPLE 1

1 g. digoxin and 300 mg. aluminum isopropylate are dissolved in 8 ml. dimethyl formamide and, after the addition of 580 mg. barium hydroxide, mixed at ambient temperature and while stirring, with 0.8 ml. dimethyl sulfate. Thereafter, the reaction mixture is stirred for four hours at ambient temperature, diluted with 50 ml. chloroform, suction filtered through kieselguhr, washed with chloroform, mixed with 4 ml, pyridine and evaporated in a vacuum. The residue is taken up in chloroform and shaken out three times with water. The collected wash waters are shaken out once with chloroform and the combined chloroform phases, after drying over anhydrous sodium sulfate, are evaporated in a vacuum. For the separation of unreacted digoxin the dry residue is subjected to a multiplicative partition with the phase mixture chloroform-carbon tetrachloride-methanol-water (1:1:1:1 by volume). The organic phase, after evaporation and recrystallization of the residue from acetone, gives 510 mg. 3'''-O-methyl-digoxin; M.P. 226–229° C.

The digoxin present in the aqueous phase is extracted with chloroform and returned to a further methylation reaction.

EXAMPLE 2

100 g. digoxin are dissolved, with slight warming, in 800 ml. dimethyl formamide. Thereafter, the solution is diluted with 800 ml. toluene, mixed with 60 g. barium hydroxide and 80 g. aluminum oxide (Brockmann) and, while stirring at ambient temperature, 80 ml. dimethyl sulfate in 800 ml. toluene added dropwise within the course of 60 minutes. Subsequently, the reaction mixture is stirred at ambient temperature for 20–24 hours, then diluted with 2.4 liters chloroform, suction filtered through 100 g. kieselguhr, washed with 2.4 liters chloroform, mixed with 400 ml. pyridine and evaporated in a vacuum to give a viscous residue. This is taken up in three liters chloroform and shaken out three times with 500 ml. amounts of water. The collected wash waters are again shaken out with 500 ml. chloroform and the combined chloroform phases are dried over anhydrous sodium sulfate and evaporated in a vacuum. Subsequently, for the separation of methyl-digoxin and digoxin, the residue is subjected to a multiplicative partition with the phase mixture chlorofrom-carbon tetrachloride-methanol-water (1:1:1:1 by volume). The organic phase, after evaporation and recrystallization of the residue from acetone, yields 46 g. 4'''-O-methyldigoxin; M.P. 226–229° C.

The digoxin present in the aqueous phase is extracted with chloroform and returned to a further methylation reaction.

It will be appreciated that the instant specification and examples are set forth by way of illustration and not limitation, and that various modifications and changes may be made without departing from the spirit and scope of the present invention.

What is claimed is:

1. In the preparation of 4'''- or 3'''-O-methyl-digoxin by the reaction of digoxin with dimethyl sulfate in the presence of dimethyl formamide and barium hydroxide, the improvement which comprises carrying out the reaction in the presence of (a) aluminum oxide or (b) aluminum isopropylate and an inert solvent, whereby there is selectively and respectively formed (a) 4'''-O-methyl-digoxin or (b) 3'''-O-methyl-digoxin.

2. Process according to claim 1, wherein the inert solvent is toluene, benzene, dioxane, a chlorinated hydrocarbon or cyclohexane.

3. Process according to claim 1, wherein after the reaction chloroform and pyridine are added and, after evaporation, the residue is separated into unreacted digoxin and 4'''-O-methyl-digoxin or 3'''-O-methyl-digoxin.

4. Process according to claim 3, wherein the separation of the residue into unreacted digoxin and methyl-digoxin is effected by multiplicative partition.

5. Process according to claim 4, wherein the multiplicative partition is carried out with the phase system chloroform-carbon tetrachloride-methanol-water, all present in approximately equal volume.

6. Process according to claim 5, wherein the unreacted digoxin present in the aqueous phase is extracted with chloroform and recycled for further reaction.

References Cited

UNITED STATES PATENTS 3,538,078   11/1970   Kaiser _____ 260—210.5

LEWIS GOTTS, Primary Examiner

J. R. BROWN, Assistant Examiner